United States Patent
Lewis et al.

(10) Patent No.: US 7,171,411 B1
(45) Date of Patent: Jan. 30, 2007

(54) METHOD AND SYSTEM FOR IMPLEMENTING SHARED SCHEMAS FOR USERS IN A DISTRIBUTED COMPUTING SYSTEM

(75) Inventors: Nina Lewis, San Mateo, CA (US); Ashwini Surpur, Fremont, CA (US); John Bellemore, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 10/086,103

(22) Filed: Feb. 27, 2002

Related U.S. Application Data

(60) Provisional application No. 60/272,521, filed on Feb. 28, 2001.

(51) Int. Cl.
*G06F 17/30* (2006.01)

(52) U.S. Cl. .................. 707/9; 707/10; 726/6; 726/2; 726/4

(58) Field of Classification Search ............ 707/9, 707/6, 10; 726/2, 4, 6
See application file for complete search history.

(56) References Cited

U.S. PATENT DOCUMENTS

| | | | |
|---|---|---|---|
| 5,450,581 | A | 9/1995 | Bergen et al. |
| 5,684,951 | A | 11/1997 | Goldman et al. |
| 5,708,812 | A | 1/1998 | Van Dyke et al. |
| 5,768,519 | A | 6/1998 | Swift et al. |
| 5,884,316 | A | 3/1999 | Bernstein et al. |
| 5,899,987 | A | 5/1999 | Yarom |
| 6,119,230 | A | 9/2000 | Carter |
| 6,145,086 | A | 11/2000 | Bellemore et al. |
| 6,158,010 | A | 12/2000 | Moriconi et al. |
| 6,178,511 | B1 * | 1/2001 | Cohen et al. .............. 713/201 |
| 6,192,130 | B1 | 2/2001 | Otway |
| 6,240,512 | B1 * | 5/2001 | Fang et al. ................ 713/150 |
| 6,243,816 | B1 * | 6/2001 | Fang et al. ................ 713/202 |
| 6,253,216 | B1 | 6/2001 | Sutcliffe et al. |
| 6,260,039 | B1 * | 7/2001 | Schneck et al. ............ 707/10 |
| 6,275,944 | B1 * | 8/2001 | Kao et al. .................. 713/202 |
| 6,289,462 | B1 | 9/2001 | McNabb et al. |
| 6,321,259 | B1 | 11/2001 | Ouellette et al. |
| 6,339,423 | B1 | 1/2002 | Sampson et al. |
| 6,377,950 | B1 | 4/2002 | Peters et al. |
| 6,385,724 | B1 | 5/2002 | Beckman et al. |

(Continued)

OTHER PUBLICATIONS

Bertino, E. et al. "Controlled Access and Dissemination of XML Documents" *Proceedings of the 2nd International Workshop on Web Information and Data Management* (Nov. 1999) pp. 22-27.

(Continued)

*Primary Examiner*—Jeffrey Gaffin
*Assistant Examiner*—CamLinh Nguyen
(74) *Attorney, Agent, or Firm*—Bingham McCutchen LLP

(57) ABSTRACT

A method and system for managing access information for users and other entities in a distributed computing system is disclosed. An aspect is directed to sharing schemas across multiple users. This can be accomplished by mapping multiple global users to the same local schema. Any users mapped to that local schema would, upon logging in, receive the set of privileges associated with the global user and the local schema. In this manner, separate schemas would not need to be defined for each global user.

57 Claims, 12 Drawing Sheets

U.S. PATENT DOCUMENTS

| | | | |
|---|---|---|---|
| 6,490,591 | B1 | 12/2002 | Denbar et al. |
| 6,507,817 | B1 | 1/2003 | Wolfe et al. |
| 6,535,879 | B1 * | 3/2003 | Behera .......................... 707/9 |
| 6,556,995 | B1 * | 4/2003 | Child et al. ..................... 707/9 |
| 6,651,168 | B1 * | 11/2003 | Kao et al. ................... 713/185 |
| 6,678,682 | B1 * | 1/2004 | Jenkins et al. ................. 707/9 |
| 6,768,988 | B2 | 7/2004 | Boreham et al. |
| 2002/0007346 | A1 | 1/2002 | Qiu et al. |
| 2002/0026592 | A1 | 2/2002 | Gavrila et al. |
| 2002/0069223 | A1 | 6/2002 | Goodisman et al. |
| 2002/0078004 | A1 | 6/2002 | Ambrosini et al. |
| 2002/0082818 | A1 | 6/2002 | Ferguson et al. |
| 2002/0083073 | A1 | 6/2002 | Vaidya et al. |
| 2003/0195888 | A1 | 10/2003 | Croft et al. |

OTHER PUBLICATIONS

Bertino, E. et al. "On Specifying Security Policies for Web Documents with XML-Based Language" *Proceedings of the 6th ACM Symposium on Access Control Models and Technologies* (May 2001) pp. 57-65

Bonczek, R.H. et al. "A Transformational Grammar-Based Query Processor for Access Control in a Planning System" *ACM Transactions on Database Systems (TODS)* (Dec. 1977) 2(4):326-338.

Castano, S. et al. "A New Approach to Security System Development" *Proceedings of the 1994 Workshop on New Security Paradigms* (Aug. 1994) pp. 82-88.

Gladney, H.M. "Access Control for Large Collections" *ACM Transactions on Information Systems (TOIS)* (Apr. 1997) 15(2):154-194.

Hsiao, D.K. "A Software Engineering Experience in the Management, Design and Implementation of a Data Secure System" *Proceedings of the 2nd International Conference on Software Engineering* (Oct. 1976) pp. 532-538.

Myers, A.C. and B. Liskov "Protecting Privacy Using the Decentralized Label Model" *ACM Transactions on Software Engineering and Methodology* (Oct. 2000) 9(4):410-442.

Sandhu, R.S. "The Schematic Protection Model: Its Definition and Analysis for Acyclic Attenuating Schemes" *Journal of the Association of Computing Machinery (JACM)* (Apr. 1988) 35(2):404-432.

Sion, R. et al. "Data Security and Protection: Rights Protection for Relational Data" *Proceedings of the 2003 ACM SIGMOD International Conference on Management of Data* (Jun. 2003) pp. 98-109.

Weed, H.F. and M. Lischka "Role-Based Access Control in Ambient and Remote Space" *Proceedings of the 9th ACM Symposium on Access Control Models and Technologies* (Jun. 2004) pp. 21-30.

Oracle8 Server Concepts, "Privileges and Roles", Release 8.0, vol. 2, Jun. 1997, pp. 25-1 through 25-15.

* cited by examiner

METHOD AND SYSTEM FOR IMPLEMENTING SHARED SCHEMAS FOR USERS IN A DISTRIBUTED COMPUTING SYSTEM

CROSS-REFERENCE TO RELATED APPLICATIONS

The present application claims the benefit of U.S. Provisional Application 60/272,521, filed Feb. 28, 2001, which is hereby incorporated by reference in its entirety.

The present application is related to the following applications: U.S. application Ser. No. 09/974,085, filed on Oct. 9, 2001, entitled "Method and System for Management of Access Information", U.S. application Ser. No. 10/084,880, filed on Feb. 27, 2002 entitled "Method and System for Management of Access Information"; and U.S. application Ser. No. 10/084,881, filed on Feb. 27, 2002 entitled "Method and System for Implementing Current User Links". The above identified applications are hereby incorporated by reference in their entirety, as if fully set forth herein.

BACKGROUND AND SUMMARY

The invention relates to computer systems, and more particularly, to a method and mechanism for managing access information in a distributed computing environment, such as a distributed database environment. Some of the tasks faced by an enterprise in managing user access and privileges include managing information about users, keeping user information current, and securing access to all the information in an enterprise. These tasks have become complex because of the increased use of technology and high user turnover in many enterprises. In addition, these tasks are also made more complex because each user may have multiple accounts and/or passwords on different network nodes. These numerous accounts are often in addition to any other operating systems based accounts possessed by the user. The effort of managing all this user information in numerous user accounts, which often contains duplicative information, leads to increased maintenance costs and decreased efficiencies.

Furthermore, the distributed nature of managing multiple user accounts leads to increased security risks. For example, whenever a user leaves a company or changes jobs, the user's account status and privileges should be changed the same day in order to guard against misuse of that user's accounts and privileges. However, in a large enterprise with numerous user accounts and passwords distributed over multiple databases, an administrator may not be able to make the timely changes required by good security practices.

Requiring a user to maintain multiple accounts on different network nodes may also create increased security risks. For example, if the user must maintain a password for each account, then the user is likely to use the same password for each of the distributed accounts. This creates a security risk since this same password information now exists in multiple account locations and the breach of that password security at one location creates a security problem at all locations, which is particularly troubling if some of the account locations have lower security precautions in place than other locations.

Accordingly, the present invention provides an improved method and system for managing access information for users and other entities in a distributed computing system. In an embodiment of the present invention, information relating to user access (e.g., name, authentication information, and user roles) is stored in a centralized directory. When the user connects to the database, the database looks up the necessary information about the user in the directory. In an embodiment, the present invention addresses the user, administrative, and security challenges described above by centralizing storage and management of user-related information in an LDAP-compliant directory service. When an employee changes jobs in such an environment, the administrator need only modify information in one location—the directory—to make effective changes in multiple databases and systems. This centralization lowers administrative costs and improves enterprise security.

An aspect of one embodiment of the invention is directed to sharing schemas across multiple users. This can be accomplished, according to one embodiment, by mapping multiple global users to the same local schema. Any users mapped to that local schema would, upon logging in, receive the set of privileges associated with that local schema in addition to those associated with the global user. In this manner, separate schemas would not need to be defined for each global user.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for centralized management of access information in a computing system. Specific orderings and combinations of process actions and system components are described herein to illustrate the invention. It will, however, be evident that various modifications and changes may be made without departing from the spirit and scope of the invention. For example, the following explanation of the invention is made with respect to a distributed system comprising database nodes (also referred to as database servers or databases).

However, the inventive concepts disclosed herein may be equally applied to other types of computing nodes. Thus, the specification and drawings are to be regarded in an illustrative rather than restrictive sense.

Overview

Figure 1:
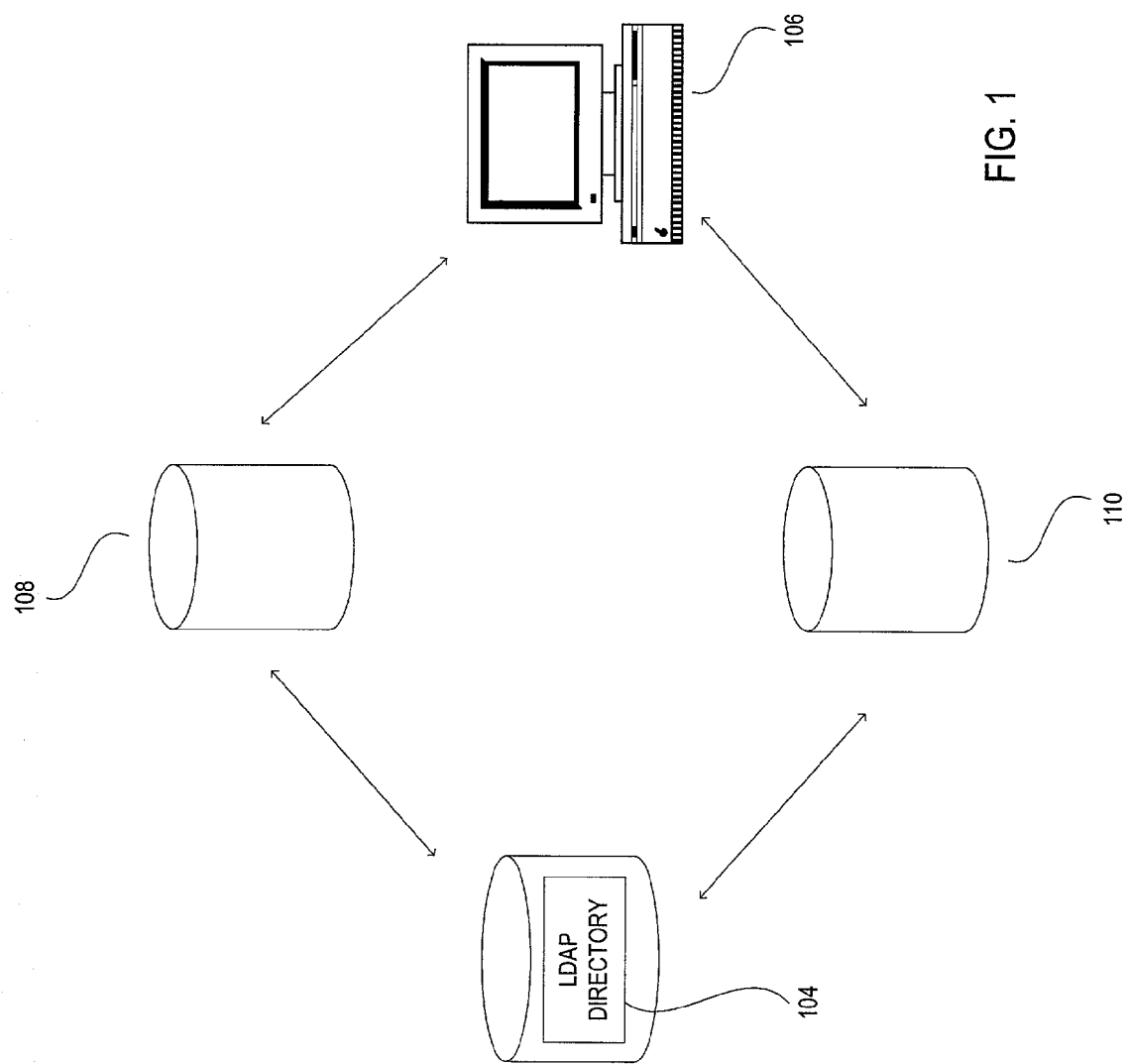
FIG. 1 depicts an architecture for storing user information according to an embodiment of the invention.

FIG. 1 shows a system for managing user and access information according to an embodiment of the invention. User access and privilege information are stored in a centralized directory information system 104, which in an embodiment comprises a LDAP directory. When a user at computer access device 106 seeks to access a first database 108 or a second database 110, "authentication" information is communicated from access device 106 to the respective database for which access is sought. Authentication refers to the process of verifying that a user is who he claims to be. This may be accomplished, for example, by requiring the user to provide a valid password associated with the user's identification or by supplying a digital certificate that validates the user's identity. The centralized directory information system 104 maintains current authentication information for authorized users of the computing system. For example, the current password and/or digital certificate validation data for users are stored at the directory information system 104. The centralized directory information system 104 communicates with each database 108 and 110 to authenticate users that seek to access any of the databases serviced by the centralized directory information system 104. Alternatively, user authentication information is stored for verification at each database 108 or 110 for which access is sought or at the client 106.

The directory information system 104 also maintains "authorization" information for each user. Authorization generally refers to the scope of privileges and roles assigned to a given user. Once a user has been successfully authenticated that user's authorization information is sent to the database for which access is sought. The authorization information determines the scope of access that is granted to the user.

Authorization and/or authentication information for users in the distributed computer system can be centrally stored and maintained in the directory information system 104. Hence, each individual database 108 and 110 is not required to locally maintain user account and access information. However, the present invention permits each local database to customize and define the exact amount, level, and scope of access that a user has in the local database based upon the centrally stored user authorization information. In effect, the present invention provides a method and mechanism for centralized management of user roles, but allows decentralized definitions of those user roles based upon the specific requirements of the local database systems.

Enterprise Users, Roles and Domains

Figure 3A:
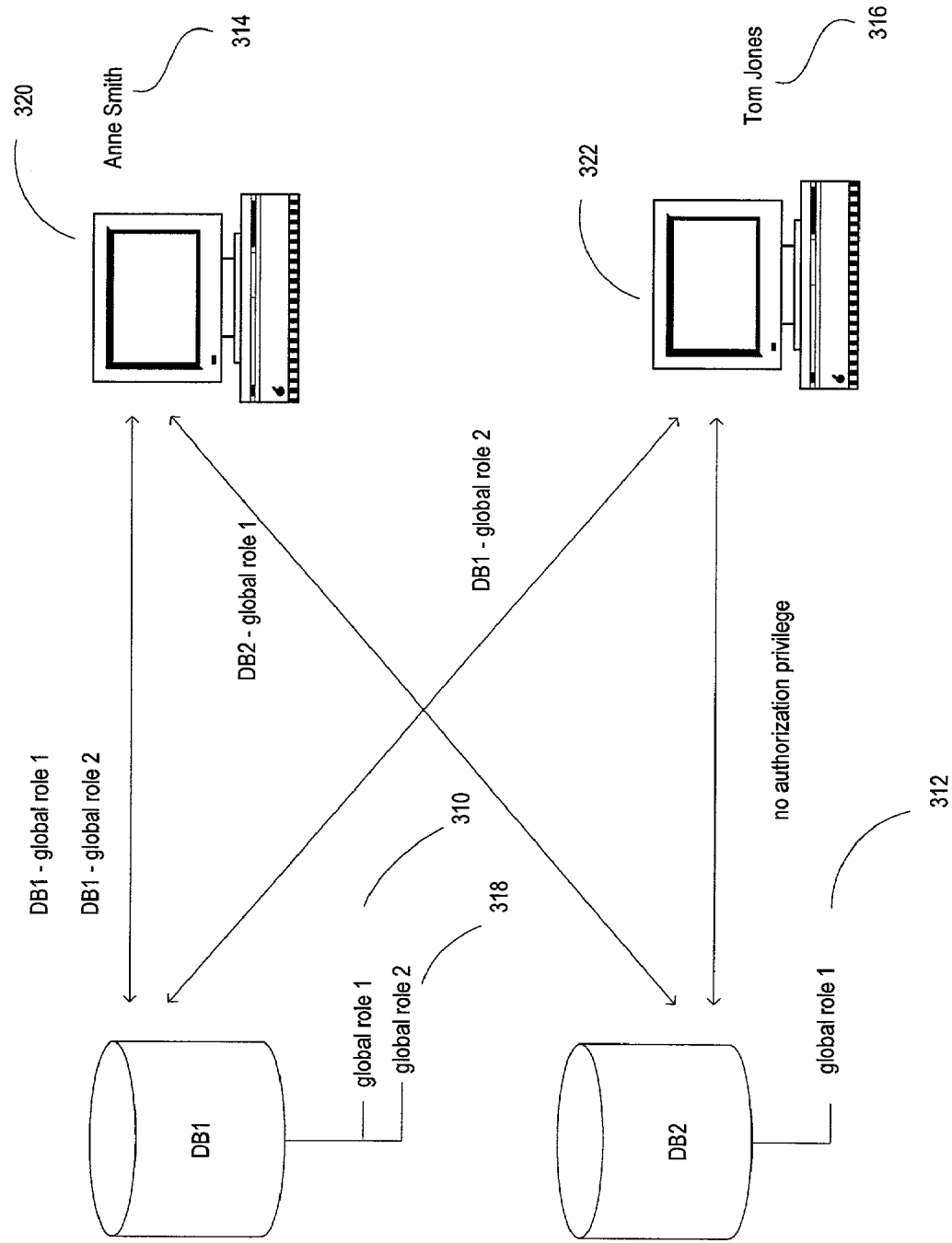
FIG. 3a depicts components of an example distributed system.

According to an embodiment, the present invention manages user access privileges to databases based upon a hierarchy of assigned "roles." To illustrate, FIG. 3*a* shows an example configuration of a first database DB1 and a second database DB2. Each database can be configured to maintain one or more sets of privileges known as "global roles." A global role is a set of privileges that is locally defined at each database, but which is centrally administered at the central LDAP directory. The first database DB1 has a local definition for two global roles 310 and 318. The second database DB2 has a local definition for a global role 312. A user 314 (Anne Smith") at a first access device 320 and a second user 316 ("Tom Jones) at a second access device 322 seek to access databases DB1 and DB2. Each user is an "enterprise user", which is a user defined and managed in a directory information system. According to an embodiment, each enterprise user has a unique identity across the enterprise.

Figure 3B:
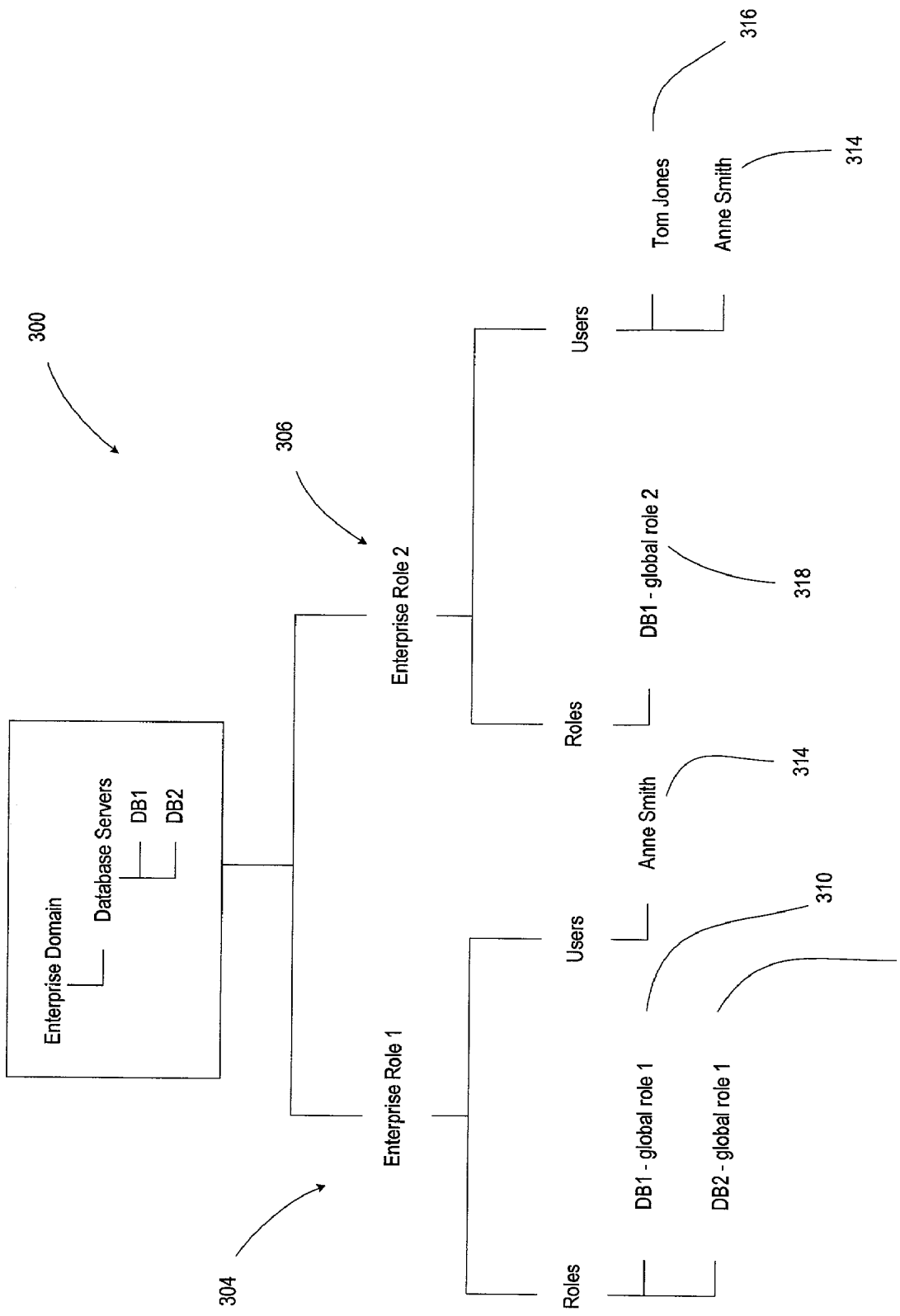
FIG. 3b represents a security hierarchy for the distributed system of FIG. 3a according to an embodiment of the invention.

FIG. 3*b* depicts an example of an enterprise domain 300 corresponding to the computing system of FIG. 3*a* according to an embodiment of the invention. An enterprise domain is a grouping of databases and roles that is used to manage user privileges. The enterprise domain 300 includes a list of the databases associated with that domain. Here, enterprise domain 300 identifies databases DB1 and DB2 as being grouped within it. It is at the enterprise domain level that roles are allocated to users to manage enterprise security according to an embodiment of the invention. Enterprise domains may be configured to match logical user or organizational boundaries. For example, the databases for each department of a large company may be grouped as separate enterprise domains.

The enterprise role hierarchy 300 includes a subtree for each "enterprise role" 304 and 306 defined in the enterprise domain. An enterprise role is a collection of global roles and associated users. As noted above, a global role is a set of defined privileges that is specific to a local database node. A user may be associated with an enterprise role, which assigns to that user the privileges defined by all the global roles contained within that enterprise role. Each enterprise role may be associated with multiple users. A user may be associated with multiple enterprise roles.

In the example enterprise domain 300 of FIG. 3*b*, a first enterprise role 304 includes two global roles 310 and 312. Global role 310 comprises a set of privileges at a first database DB1. Global role 312 comprises a set of privileges at a second database DB2. A first user 314 ("Anne Smith") is associated with enterprise role 304. Each user associated with enterprise role 304 has all of the privileges defined by global roles 310 and 312. Thus, when user Anne Smith 314 accesses database DB1, the privileges granted by global role 310 are given to user 314 based upon the user's association with first enterprise role 304. Similarly, when user Anne Smith 314 accesses database DB2, the privileges granted by global role 312 are given to that user based upon the user's association with first enterprise role 304.

The second enterprise role 306 includes a single global role 318 for a set of privileges granted at database DB1. Users 314 and 316, Anne Smith and Tom Jones respectively, are associated with enterprise role 306. Thus, when either user Anne Smith 314 or Tom Jones 316 accesses database DB1, the privileges granted by global role 318 are given to that user based upon the user's association with enterprise role 306.

Note that neither enterprise role 304 nor enterprise role 306 provides user Tom Jones 316 with any privileges at database DB2. Enterprise role 304 includes a global role 312 for database DB2, but user Tom Jones 316 has not been associated with this enterprise role 304. User Tom Jones 316 is associated with enterprise role 306, but this enterprise role does not include a global role for database DB2. Thus, even if user Tom Jones 316 is authenticated for access to database DB2, this user does not obtain any privileges or roles at that database unless such privileges and roles are locally defined outside of the enterprise roles.

According to an embodiment of the invention, a database obtains a user's global roles when the user logs in. If a user's global roles change, those changes do not take effect until the next time the user logs in. More details regarding the process for logging in is described below.

Centralized Directory Information System

According to an embodiment of the invention, the relationships between users and their associated roles in an enterprise domain structure are maintained as a hierarchy of objects in a directory information system. A directory in a directory information system can be considered an index to organized information. The directory lists objects, e.g., people and organizations, and gives details about each object. In a computerized environment, a directory is a database that stores collections of information about objects. The information in such a directory might represent any resource that require management—for example, employee names, titles, and security credentials, information about e-commerce partners, or about shared network resources such as conference rooms and printers.

A common directory information system is a directory based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan at http://www.umich.edu/~dirsvcs/ldap/, including the following documents (which are hereby incorporated by reference in their entirety): *RFC*-1777 *Lightweight Directory Access Protocol; RFC*-1558 *A String Representation of LDAP Search Filters; RFC*-1778 *The String Representation of Standard Attribute Syntaxes; RFC*-1779 *A String Representation of Distinguished Names; RFC*-1798 *Connectionless LDAP; RFC*-1823 *The LDAP Application Program Interface; and, RFC*-1959 *An LDAP URL Format.*

The present invention is described with reference to LDAP directories. LDAP directory systems are normally organized in a hierarchical structure having entries (i.e., objects) organized in the form of a tree, which is referred to as a directory information tree ("DIT"). The DIT is often organized to reflect political, geographic, or organizational boundaries. In an LDAP directory, each collection of information about an object is called an entry. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Databases (and other LDAP clients) refer to entries in the directory information system to determine enterprise user authorization at login. In an embodiment, the enterprise domain is associated with at least two types of objects: enterprise role objects and mapping objects. Enterprise role objects contain information about roles in the computing system. Mapping object contains mapping information between a full or partial distinguished name ("DN") in the directory information system and a user/schema name. Mapping objects are normally created for a particular domain. Mapping objects also reside under server objects, and are created for a particular database.

Figure 2A:
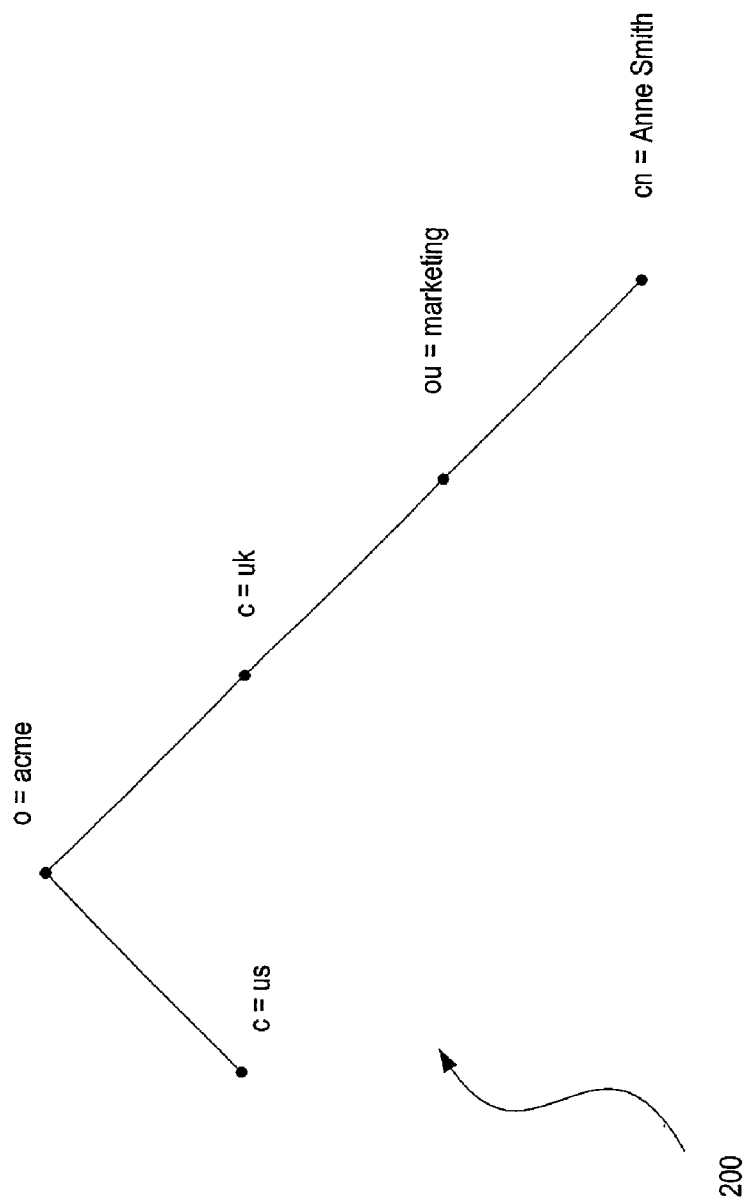
FIG. 2a represents an example directory information tree.

As noted above, each entry in an LDAP directory is uniquely identified by a distinguished name (DN). The distinguished name identifies where the entry resides in the directory's hierarchy. The directory hierarchy can often be represented in a tree structure, referred to as a directory information tree (DIT). An example of a DIT 200 is shown in FIG. 2*a*. The DIT 200 in FIG. 2*a* is structured along geographical and organizational lines. The example DIT 200 uses the following notation to define distinguished name components:

o=organization
c=country
ou=organizational unit
cn=common name

In DIT 200, the branch on the right represents the entry for a person "Anne Smith," who works in the organizational unit (ou) "Marketing", in the country (c) of Great Britain (uk), in the organization (o) Acme. The DN for this Anne Smith entry is:

cn=Anne Smith,ou=Marketing,c=uk,o=acme.

Note that the conventional format of a distinguished name for a LDAP directory starts with the least significant component (that naming the entry itself) and proceeds to the most significant component (that just below the root).

In an embodiment of the invention, one or more administrative contexts are created in the directory to store enterprise information. The administrative context is created by an entity having suitable access permissions in the directory on a particular administrative context. For example, the person trying to create a new Context in "c=uk,o=acme" would need suitable permissions on that entry. The administrative context is created directly underneath, so that the root of the administrative context is "cn=AdminContext, c=uk,o=acme".

Any number of contexts may be suitably employed in the directory. Examples of contexts used in embodiments of the invention are user-defined contexts and root context. The root context sits at the root of the directory tree. In the preferred embodiment, there exists one root context, but there may be any number of user-defined contexts in a directory. A user-defined Context is created by an entity with access permissions in the directory on a particular administrative context. In an embodiment, the context includes the attribute names that will hold a nickname attribute and the user search base. The default for the Nickname Attribute in one approach is CN and the default for User Search Base is the root of the DIT or the parent of the administrative context.

An enterprise domain object, which may also be referred to as a RDBMS (relational database management system) Enterprise Domain object, is an object class that is employed in embodiments of the invention. In an embodiment, objects in this class maintain the enterprise domain name (RDN) and the list of RDBMS servers participating in the enterprise domain. Note that other types of database management systems may also be employed with the present invention (e.g., object-based databases), and thus the invention is not limited to relational databases. Enterprise domain objects may also track the global users participating in the respective domains. The list of users can have either user names or group names. The list of users defines the global users set. This object class may also include a list of accepted authentication types for databases in the domain, such as password, SSL, and/or ALL.

A server object, which can also be referred to as a RDBMS Server Object, is another object class that is employed in embodiments of the invention to identify database servers in the enterprise domain. Objects in this class may include attributes that identify the server name (RDN), server global name, server certificate, directory password, and a list of trusted users permitted for direct links between servers without authentication. According to an embodiment, the server object exists directly under the cn=AdminContext object, but it may also be located elsewhere. The server object may include other attributes, such as additional attributes for storing information regarding network aliases, server certificates, and listener information.

The enterprise role object is another object usable in the invention, which corresponds to the set of global roles that are assigned to an enterprise role. Enterprise roles may also contain other enterprise roles. This object may also contain the list of users to whom these roles are assigned. According to an embodiment, the enterprise role entries exist under the enterprise domain entry. Enterprise roles contain server global roles and may contain enterprise roles in a recursive manner. The enterprise roles can be assigned to users. The role assignees can be user groups also. The user group is useful for mapping defined group concepts for role assignment. The user's X.500 distinguished name, which is used for authentication using SSL, is an item of information used for role assignment in the enterprise role object. In an alternate embodiment, SSL is not employed and this information is not based on the DN.

An enterprise role comprises server global roles in an embodiment, and may contain enterprise roles in a recursive manner. This object class may include another object class for grouping users, so that users allocated this role will be represented as members of the group. The role assignees can be user groups also. The user group is useful for mapping OS defined group concept for role assignment, for example, the NT user groups. The user entry is preferably not modified for assigning roles. The user's X.500 distinguished name, which is used for authentication using SSL, is an item of information used for role assignment in the enterprise role object in one embodiment. In an embodiment, the enterprise role will contain the following information: (a) Zero or more global roles; (b) Zero or more enterprise roles; and (c) List of users to whom the enterprise role has been assigned.

The User Object is another object class that may be employed in embodiments of the invention. In an embodiment, users who intend to make use of the security framework of the invention are associated with a globally unique name, e.g., X.500 Distinguished Name. In one embodiment, this name is used when roles are assigned to these users. As noted above, the user entry is preferably not modified for assigning roles. Other user information, e.g., unique user information such as a global user ID, may also be employed when assigning roles.

Mapping objects comprise another object class useable in the invention. As described in more detail below, these objects are used for schema assignments, to map enterprise users to local database schemas. The mapping object contains the mapping of an enterprise DN and a native database username. According to an embodiment, the mapping object exists as a child of a server object or of an enterprise domain object. In an embodiment, the mapping object is a group object, where the CN attribute reflects the schema name and the members attribute contains all users who map to that schema. In an alternate embodiment, the mapping object is not a group object, where a native user attribute reflects the schema name and a distinguished name attribute contains the user identification that maps to a schema. An entry level mapping object according to an embodiment is an objectclass that contains a single mapping represented as two attributes: a full DN for an Enterprise User and a native username. A subtree-level mapping object is an objectclass that contains a single mapping represented as two attributes, e.g., a DN that does not necessarily represent an Enterprise User, and a native username. Only users under that DN in the directory tree will be mapped to the specified native user. If the DN itself is a user, then that user is not mapped to the native user. A full DN preferably takes precedence over a partial DN, and a mapping under the server takes precedence over one under that server's enterprise domain.

Figure 2B:
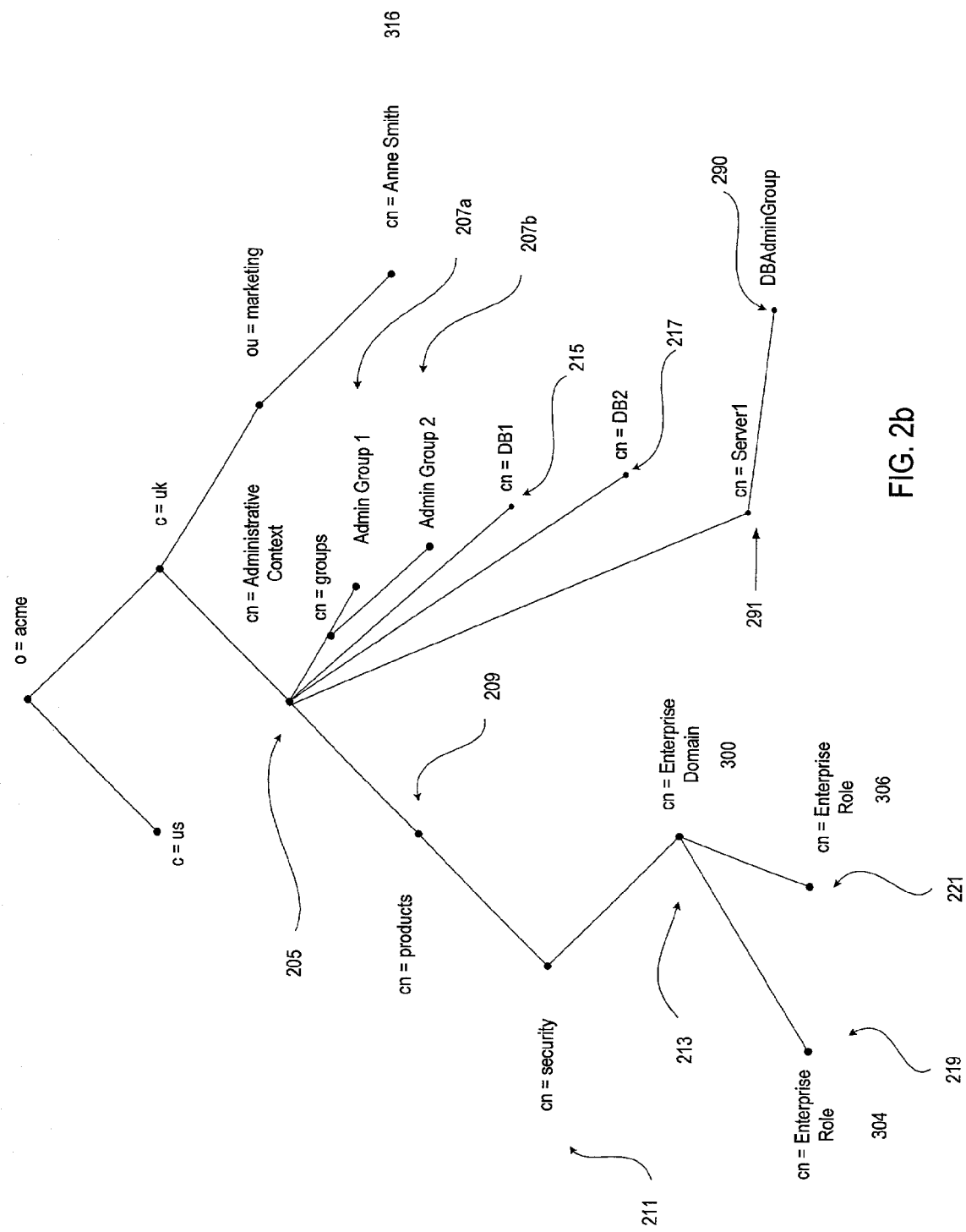
FIG. 2b represents a directory information tree having security management objects according to an embodiment of the invention.

One or more naming contexts can be chosen to contain enterprise information. To illustrate, shown in FIG. 2b are additional administrative entries added to the LDAP DIT 200 of FIG. 2a. An administrative context 205 (cn=Administrative Context) is a created as a special entry in the LDAP directory to contain entries to support directory naming and enterprise user security. Various container objects may exist in the administrative context subtree. For example, a products container object 209 and a security container object 211 may exist in the subtree beneath the administrative context 205.

According to an embodiment, enterprise domain information is represented in the LDAP directory by adding one or more enterprise domain objects 213 in the subtree beneath the security container object 211. For the purposes of illustration, the enterprise domain object 213 in FIG. 2b is shown representing the enterprise domain 300 of FIG. 3b. Therefore, the subtree beneath enterprise domain object 213 includes objects that match the enterprise domain hierarchy shown in FIG. 3b. The enterprise domain object 213 includes an attribute that identifies the databases associated with the domain.

Any enterprise roles associated with enterprise domain 300 would be represented as enterprise role objects in the subtree beneath enterprise domain object 213. Thus, enterprise role object 219 in the subtree beneath enterprise domain object 213 represents enterprise role 304 of FIG. 3b. A first attribute or set of attributes in enterprise role object 219 identifies the global roles associated with enterprise role 304. A second attribute or set of attributes in enterprise role object 219 contains a mapping between enterprise users and enterprise role 304. Similarly, enterprise role object 221 in the subtree beneath enterprise domain object 213 represents enterprise role 306 of FIG. 3b. A first attribute or set of attributes in enterprise role object 221 identifies the global roles associated with enterprise role 306. A second attribute or set of attributes in enterprise role object 221 contains a mapping between enterprise users and enterprise role 306.

Any enterprise domain structure can be mapped into an LDAP directory tree by adding one or more entries corresponding to the enterprise entity being mapped. While the above description of the embodiment shown in FIG. 2b describes example locations for the placement of objects within the administrative context 205, it is noted that other embodiments of the invention may locate any or all of the objects in alternate locations within the LDAP directory.

The subtree under the administrative context 205 can also include other objects representing other entities in a computer system, such as server and network entities. For example, the administrative context may include a database server object. In the example of FIG. 2b, objects 215 and 217 in the subtree beneath administrative context entry 205 identify the databases DB1 and DB2. A database server object contains information about a database server. It can be created during the database installation and can be added later by members of the privileged administrative groups. A database server object is the parent of database level mapping objects that contain mapping information between full or partial DNs and shared schema names, as described in more detail below.

Access to enterprise domain, enterprise role and the RDBMS server object entries should be properly managed for security access reasons. Thus, permission to create, delete or modify enterprise domain and the enterprise role object entries should be granted only to authorized enterprise domain administrators.

Access control lists ("ACLs") are employed in one embodiment to control access to enterprise objects. When administrative operations are attempted within a directory, the directory server checks the enterprise ACLs to ensure that the user has the required permissions to perform those operations. Otherwise, the operation is disallowed. Thus, ACLs in the directory protect directory data from unauthorized operations by directory users. According to an embodiment, ACLs may be assigned to an entire group of administrators. For an LDAP directory, this is accomplished by defining group objects whose membership will be a list of user DNs. The Enterprise Domain and the subtree under it (for enterprise roles) will use the same ACLs for the enterprise domain entry and the subtree. The server object may also be administered by a group of administrators although the membership of this group may be different from the membership of enterprise domain administrators. Some of the security-related directory objects that may be protected using ACLs are: (a) Databases; (b) Enterprise domains; (c) Default Domain; (d) Enterprise roles; (e) Administrative groups; (f) Database Level Mappings; and (g) Domain Level Mappings. For each object, the ACL limits who can create, modify, or read them. The Default Domain could be created by default at context creation and newly created databases can be automatically placed in this domain.

Shared User Schema

A benefit of the present invention for managing users in a directory is that the number of user accounts created for the distributed databases can be reduced. For example, suppose users John, Mary, and Jane are all users of an application that accesses a Finance database. In conventional approaches to user management, a separate account or schema would be created on the Finance database for each of these users. If there are additional databases that these users seek to access, then a separate user schema is created at every such database. However, creating individual schemas for each user on each database could be overly expensive and inefficient, particularly if there are a large number of users/thin clients accessing the database and many of those users seek to access the same database applications. This is particularly true if the users do not need to create their own objects in the database. The present invention provides a method and mechanism for allowing users to share schemas on a database such that users do not need their own accounts or schemas.

The present invention supports a method and mechanism for mapping one or more enterprise users to the same "shared schema" on an individual database or computing system. A shared schema is a schema that is accessible by more than one enterprise user in the system. Instead of creating a separate user account or schema in each database a user needs to access, as well as creating the user in the directory, the enterprise user identification is created once in the directory and the enterprise user is "pointed" at a shared schema that many other enterprise users can also access. In effect, user-schema separation eliminates the need to have a dedicated database schema on each database for every enterprise user. Each enterprise user can be mapped to a shared schema on each database he needs to access.

Figure 4:
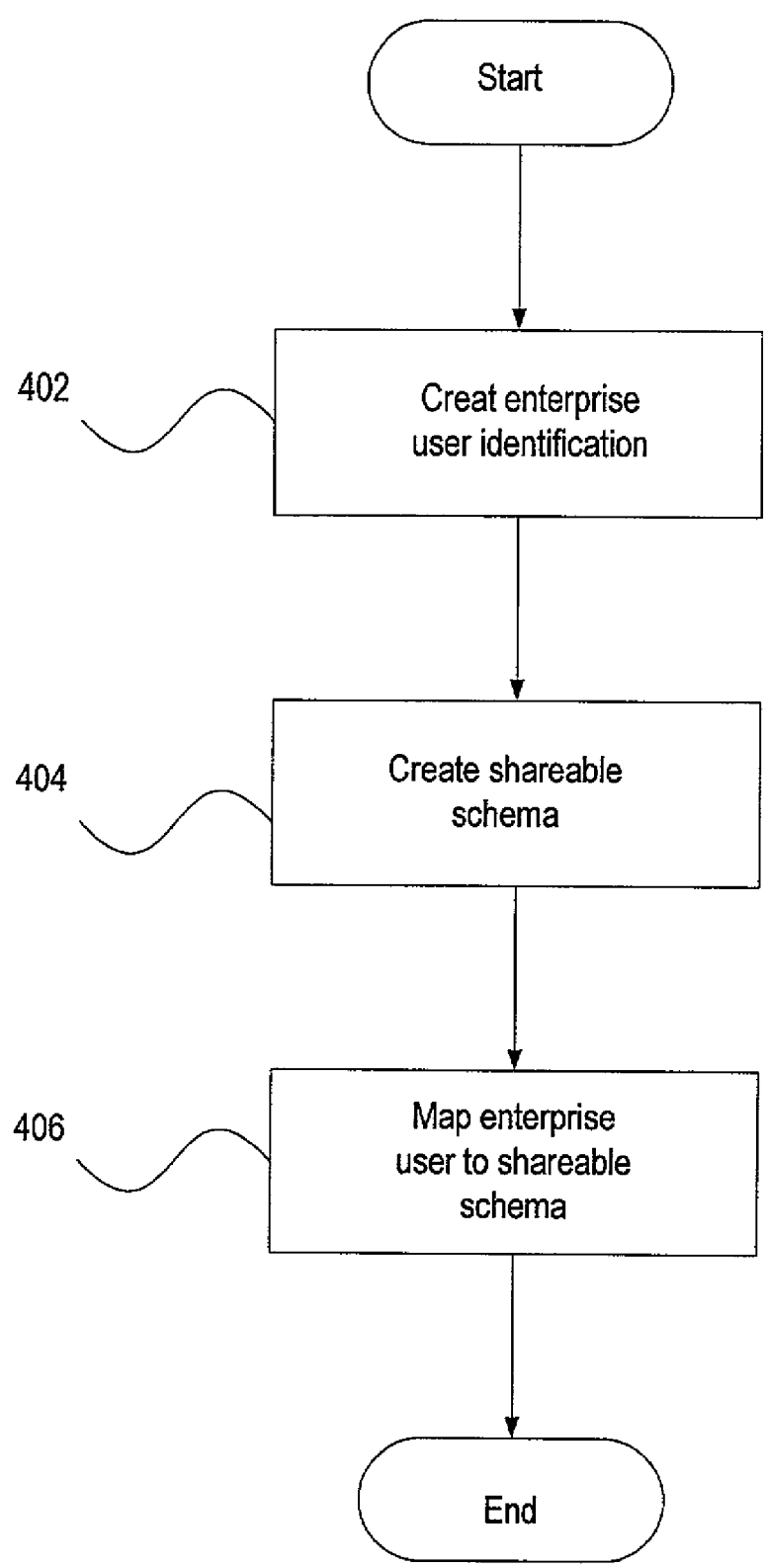
FIG. 4 shows a flowchart of a process for creating a shared schema according to an embodiment of the invention.

FIG. 4 depicts a flowchart of a process for implementing shared schemas according to an embodiment of the invention. At 402, an enterprise user identification is created in the directory. This step may be implemented, for example, by populating an LDAP directory with user objects representing unique DN entries for each individual enterprise user in the system. At 404, a shareable schema is created at a database. Each database may include any number of such shareable schemas. In an embodiment, a shareable schema is created with organizational/physical characteristics like any unique user schema created on a database, but is identified as being sharable among multiple enterprise users. Like a unique schema, the shareable schema is therefore associated with a local/native database username. For each database that an enterprise user seeks to access, the enterprise user may be "mapped" to a shareable schema on that database (406). The enterprise user may also be mapped to shareable schemas on multiple databases.

The mapping between enterprise users and a schema can be locally performed at the database itself or centrally at the directory. In an embodiment, the mapping is performed in the directory by means of one or more mapping objects. This mapping can be specific to a single entry on a single directory level, or can be a mapping that applies to an entire subtree of entries. The mapping objects can be defined at the database level or at the domain level. According to an embodiment, if the mapping is at the domain level, then this provides a default mapping for the specified users at databases in the domain.

A single-level mapping object is referred to as an "EntryLevelMapping" or "full DN mapping" object. This mapping object maps the full Distinguished Name (DN) of a user, e.g., as contained in a user's X.509 certificate, to a database schema that the user will access. This mapping results in one mapping entry per user for the database. There can be any number of full DN mappings for a database that map multiple users to the same schema. When using full DN mapping, each enterprise user can either be mapped to a unique schema or to a shared schema. In an alternate embodiment, a unique user attribute, e.g., a global user ID, is mapped instead of the DN.

A subtree mapping object is referred to herein as a "SubtreelevelMapping" or "partial DN mapping" object. This approach maps enterprise users to schemas using partial DN mapping. A partial DN mapping is particularly useful if multiple enterprise users that have something in common are already grouped under some common root in the directory tree. The subtree corresponding to these users can be mapped to a shared schema on a database. For example, all enterprise users in the directory subtree corresponding to a particular organizational division can be mapped to the same shared schema on commonly accessed database(s). In this way, multiple enterprise users sharing part of their DN can access the same shared schema.

When determining the schema to which a user is connected, the database uses the following precedence rules in an embodiment. The database first looks for the mapped schema locally. If the schema mapping is not found locally, then the directory is searched. Within the directory, the database looks under the server object, first for a full DN mapping, then for a partial DN mapping. If the database does not find a mapping object under the server object, it looks under the domain object, first for a full DN mapping, then for a partial DN mapping. If the database does not find a mapping object in the domain object, then the database refuses the connection.

Figure 5:
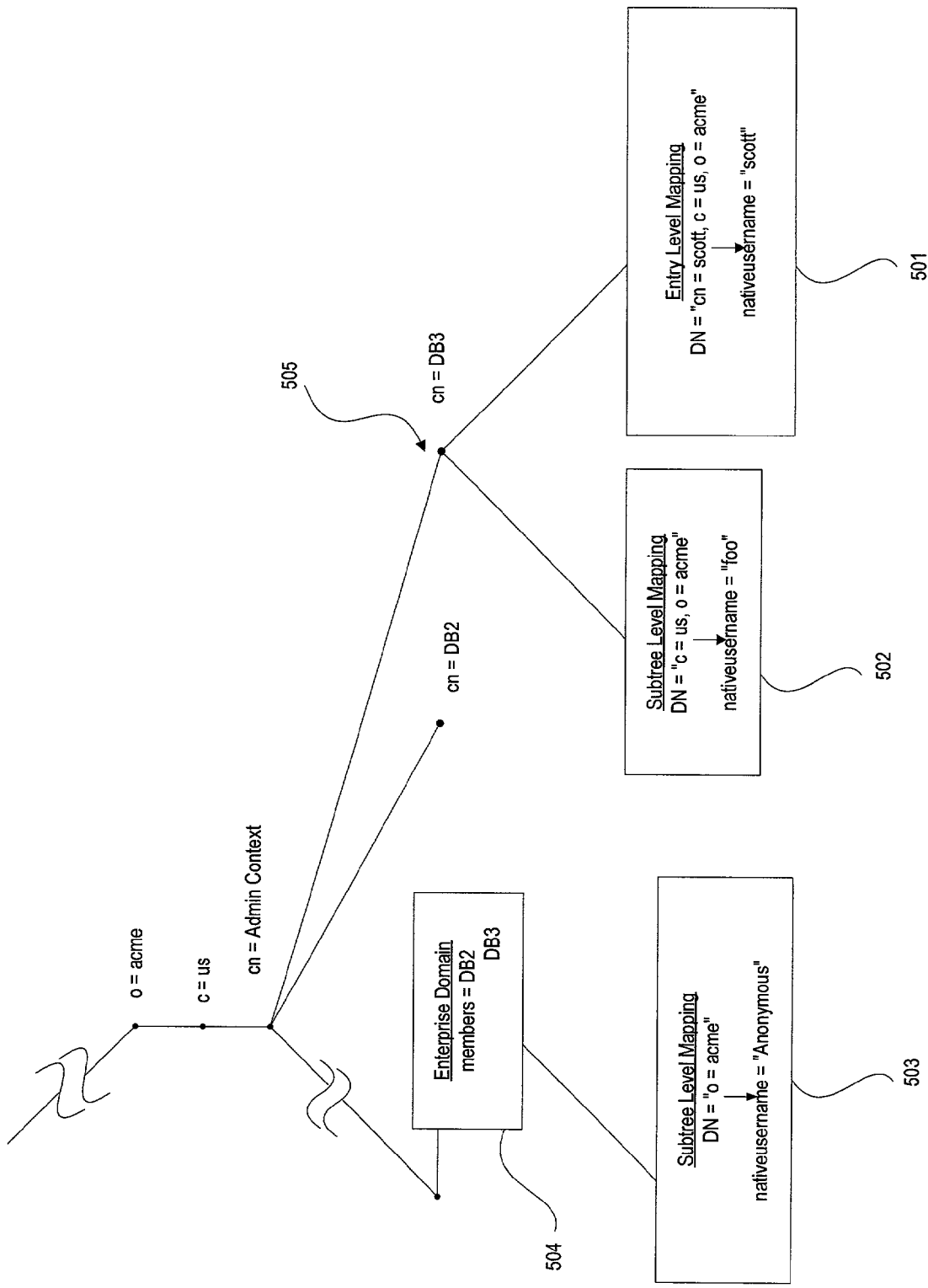
FIG. 5 shows a directory information tree with mapping objects according to an embodiment of the invention.

FIG. 5 illustrates mapping objects in a directory according to an embodiment of the invention. An entry-level mapping object 501 has been established for the user having a full DN of "cn=scott,c=us,o=acme", which maps this enterprise user to the local schema "scott" in the DB3 database ("NativeUserName" identifies the local schema for object 501 in this example). Only the user matching the specified DN is mapped based upon this entry level mapping object. Note that the mapping object 501 for database DB3 resides in the subtree below the database server object 504 for database DB3. Mapping objects specific to a particular database are preferably located in the subtree beneath that database server object.

A subtree-level mapping object ("SubtreelevelMapping") 502 in the subtree beneath the database server object 505 (database DB3) has been established for users having the partial DN "c=us,o=acme", which maps these users to the local schema "foo" in the DB3 database. If a subtree-level mapping object is created, then all users beneath the given partial DN will be mapped to the local/native user schema. Multiple users may fall within the scope of a subtree-level mapping object.

A subtree-level mapping object 503 has also been established beneath the enterprise domain object 504 for users having the partial DN "o=acme", which maps these users to the schema "Anonymous" on the DB2 and DB3 databases.

The user having a full DN "cn=scott,o=acme,c=us" falls within the defined scope of more than one of the mapping objects 501, 502, and 503 in FIG. 5. As noted above, entry-level mapping objects take precedence over subtree-level mapping objects in an embodiment. When multiple subtree-level mapping objects apply to a user, the subtree-level mapping object with the specific subtree root lower in a directory tree preferably takes precedence over a subtree-level mapping with a subtree root higher in the directory. Also, any database specific mappings preferably takes precedence over domain mapping objects.

Figure 6A:
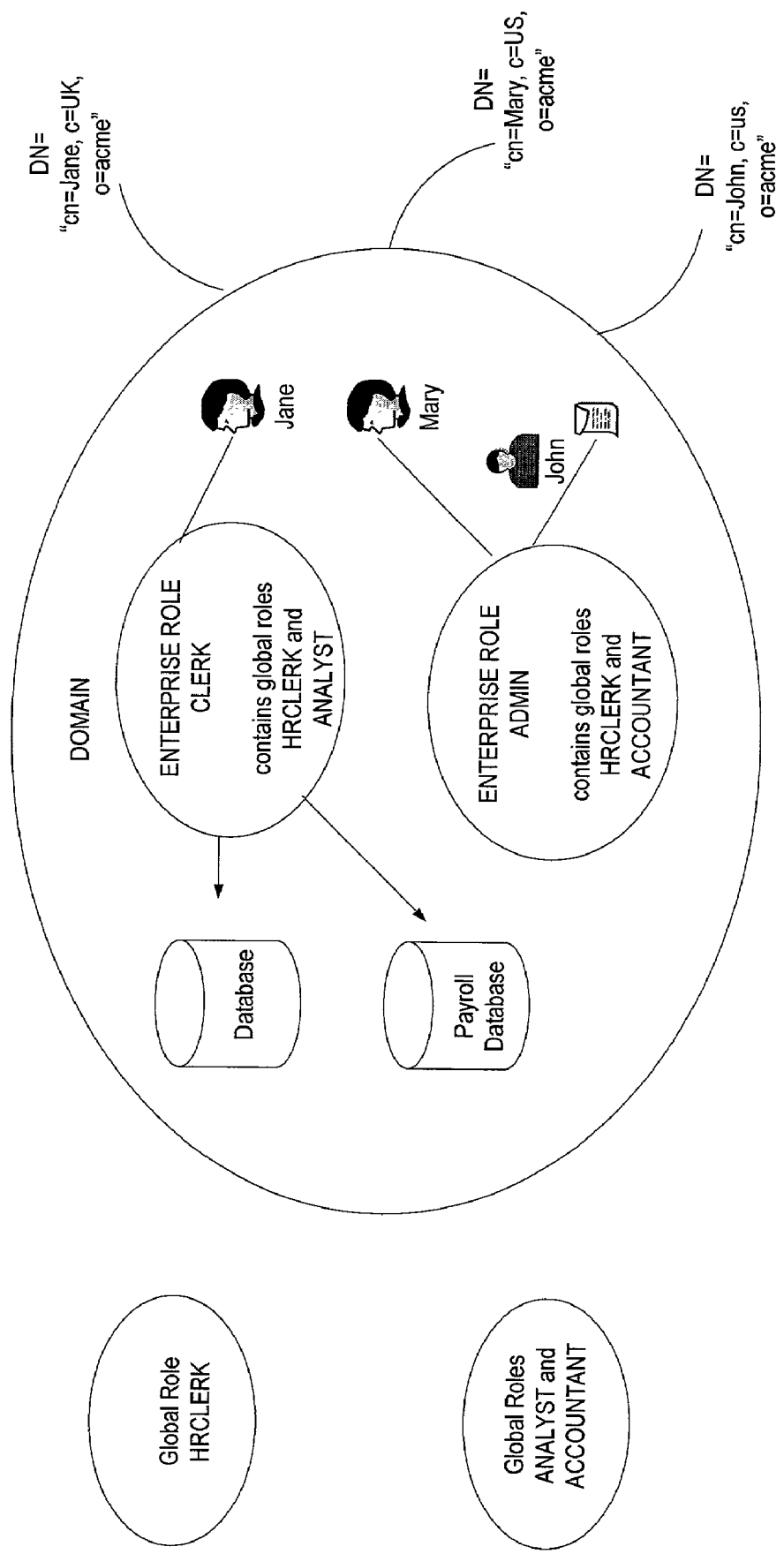
FIG. 6a depicts components of an example distributed system.
Figure 6B:
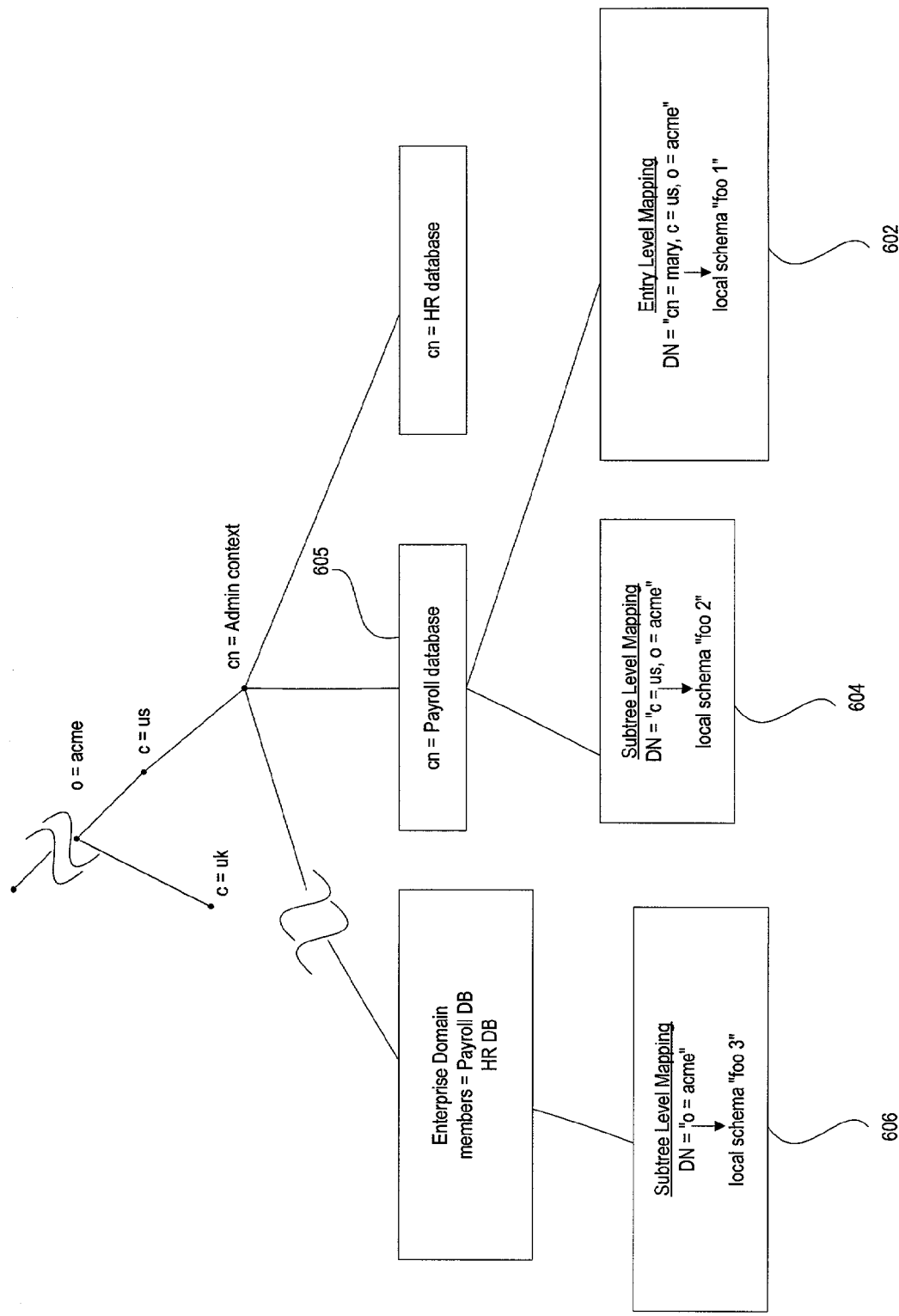
FIG. 6b shows a directory information tree.

FIGS. 6a and 6b illustrate a usage scenario for the invention. In FIG. 6a, an enterprise role ADMIN is associated with the global role HRCLERK on the Human Resources database and the ACCOUNTANT role on the Payroll database. In addition, an enterprise role CLERK is associated with the global role HRCLERK on the Human Resources database and the ANALYST role on the Payroll database. As already stated, an enterprise role can be granted or revoked to one or more enterprise users, e.g., an administrator could grant the enterprise role CLERK to a number of enterprise users who hold the same job.

Several enterprise users are defined in the system. User Jane has a full DN of "cn=Jane,c=uk,o=acme". User Mary has a full DN of "cn=Mary,c=us,o=acme". User John has a full DN of "cn=John,c=us,o=acme". In this example, users John and Mary are both associated with the enterprise role ADMIN. User Jane is associated with enterprise role CLERK. Such associations between users and roles may be implemented, for example, using the methods and mechanisms described with reference to FIGS. 2–3.

Consider if it is desired to map enterprise users John, Mary, and Jane to shared schemas on the HR and Payroll databases. In this scenario, one or more shared schemas are created for both the HR and Payroll databases. For example, shared schemas "foo1", "foo2", and "foo3" can be created on both databases. Referring to FIG. 6b, the LDAP directory is modified to include mapping objects 602, 604, and 606 to map users John, Mary, and Jane to these shared schemas.

Mapping object 602 sits in the directory tree beneath the database server object 605, and is an entry-level mapping object that maps the full DN of user Mary to the local schema "foo1" on the Payroll database. Mapping object 604 also lies beneath database server object 605, and is a subtree-level mapping object that maps all users having the partial DN c=us,o=acme" to the local schema "foo2" on the Payroll database. Mapping object 606 is a domain mapping object, e.g., a subtree-level mapping object defined at the domain level, that maps all users having the partial DN "o=acme" to the local schema "foo3" on either the HR or Payroll databases.

When user Mary logs into the Payroll database, she will be associated with the local schema "foo1" based upon the entry-level mapping object 602. The scope of her privileges on the Payroll database is defined by her membership in the enterprise role ADMIN, i.e., the global role ACCOUNTANT on the Payroll database, as well as any roles and privileges locally defined for the "foo1" schema. Note that there is no entry-level mapping object that maps user Mary to a local schema for the HR database. Instead, a domain mapping object 606 maps all users having the partial DN "o=acme", which includes user Mary, to the local schema "foo3" on both the HR and Payroll databases. Thus, user Mary will log into the HR database using the "foo3" shared schema. Her privileges on the HR database are defined by her membership in the enterprise role ADMIN, i.e., the global role HRCLERK, as well as any local roles and privileges locally defined for the "foo3" schema.

There is a possible conflict between the entry-level mapping object 602, the database subtree-level mapping object 604, and the domain subtree-level mapping object 606 in mapping user Mary to a schema on the Payroll database (i.e., entry-level mapping object 602 maps user Mary to schema foo1, the database subtree-level mapping object 604 maps users Mary to schema "foo2", and domain subtree-level mapping object 606 maps user Mary to schema foo3). When there is a conflict between an entry-level mapping object and subtree-level mapping objects, then the entry-level mapping preferably takes precedence over the subtree-level mappings. Thus, the mapping of user Mary for a shared schema on the Payroll database is defined by the entry-level mapping object 602 rather than the subtree-level mapping objects 604 and 606.

When user John logs into the Payroll database, he will be associated with the local schema "foo2" based upon the subtree-level mapping object 604. The scope of this user's privileges on the Payroll database is defined by his membership in the enterprise role ADMIN, i.e., the global role ACCOUNTANT on the Payroll database, as well as any roles and privileges locally defined for the "foo2" schema. A domain mapping object 606 exists that maps all users having the partial DN "o=acme", which includes user John, to the local schema "foo3" on both the HR and Payroll databases. Thus, user John will log into the HR database using the "foo3" shared schema. His privileges on the HR database are defined by membership in the enterprise role ADMIN, i.e., the global role HRCLERK, as well as any local roles and privileges locally defined for the "foo3" schema.

There is a possible conflict between the database subtree-level mapping object 604 and the domain subtree-level mapping object 606 in mapping user John to a schema on the Payroll database. When this type of conflict occurs, the database subtree-level mapping preferably takes precedence over the domain subtree-level mapping. Thus, the mapping of user John for a shared schema on the Payroll database is defined by the database subtree-level mapping object 604 rather than the domain subtree-level mapping object 606.

When user Jane logs into either the Payroll or HR databases, there are no database-specific mapping objects to map a local shared schema for user Jane. Instead, the domain mapping object 606 maps all users having the partial DN "o=acme", which includes user Jane, to the local schema "foo3" on the HR and Payroll databases. Thus, user Jane will log into the HR and Payroll databases using the "foo3" shared schema. The scope of this user's privileges on both databases is defined by membership in the enterprise role CLERK, i.e., the global role ANALYST on the Payroll database and the global role HRCLERK on the HR database. This user also gains the roles and privileges associated with the local schema "foo3" on each database.

When any of these users connect to a database, he/she is automatically connected to a schema based upon the relevant mapping object for that user and database. As shown in FIGS. 6a and 6b, multiple enterprise users can be mapped to the same shared schema. However, the privileges associated with each user may be different, despite the shared schema, by associating each user with a specific enterprise role or roles. Moreover, since each user logs in under an individual enterprise username, the users can be individually audited for their access history despite the shared schemas. In addition, no or minimal administrative overhead is required at a database server to provide an enterprise user with access to the server, since the user can be mapped to an existing shared schema.

Figure 7:
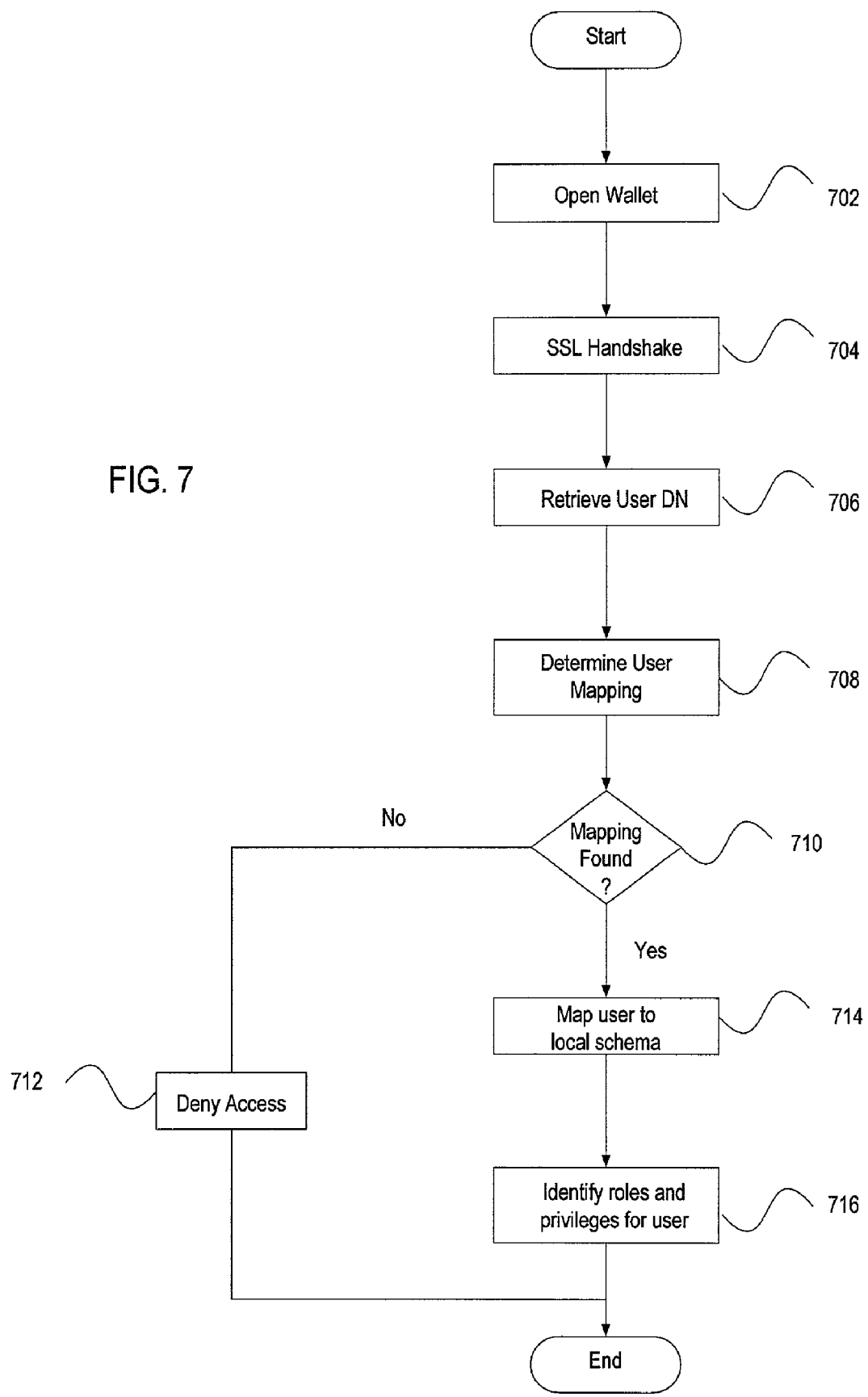
FIG. 7 shows a flowchart of a process for using shared schemas according to an embodiment of the invention.

Referring to FIG. 7, shared schema functionality in an embodiment of the present invention uses SSL for authentication to the database. SSL authentication occurs as follows in an embodiment: Prior to connecting to a database, an enterprise user opens a wallet by providing a password (702). When connecting, an SSL handshake is performed with the database, during which the user's unique certificate is passed to the server; this handshake authenticates the user to the server (704). The database extracts the user's DN from the user's certificate and looks it up in the database (706). If the database does not find the DN locally, it looks up the appropriate DN mapping in the directory (708). This DN mapping object in the directory associates a user with a database schema. In an embodiment, the database may find: (a) a Full DN (entry-level) mapping which associates the DN of a single directory user with a particular schema on a database; (b) a Partial DN (subtree-level) mapping which associates multiple enterprise users within the same subtree to the same shared schema; or (c) no mapping at all. If the database does not find either the DN locally or an appropriate DN mapping object in the directory (710), it refuses the user's connection to the database (712). If the database does find either the DN locally or the appropriate DN mapping object in the directory, the database allows the user to log on. The database then maps the user to the associated schema (714). The database retrieves this user's global roles for this database from the directory (716). The database also retrieves from its own records any local roles and privileges associated with the database schema to which the user is mapped. The database uses both the global and the local roles to determine the information that the user can access.

In an embodiment, a local database server may "opt out" from the shared schema arrangement described above. For example, this can be accomplished by ensuring that no sharable schemas are created at the local server. Thus, mappings cannot occur between an enterprise user and a shared schema. In addition, the local database server can be configured such that users can use local roles only and do not utilize global roles in the directory. To implement this in an embodiment, global roles are not created by the local server. If this configuration is set, the database uses only local roles to determine the scope of user access. This allows users and database servers to use the central directory for client authentication, but manage user roles locally.

System Architecture Overview

Figure 8:
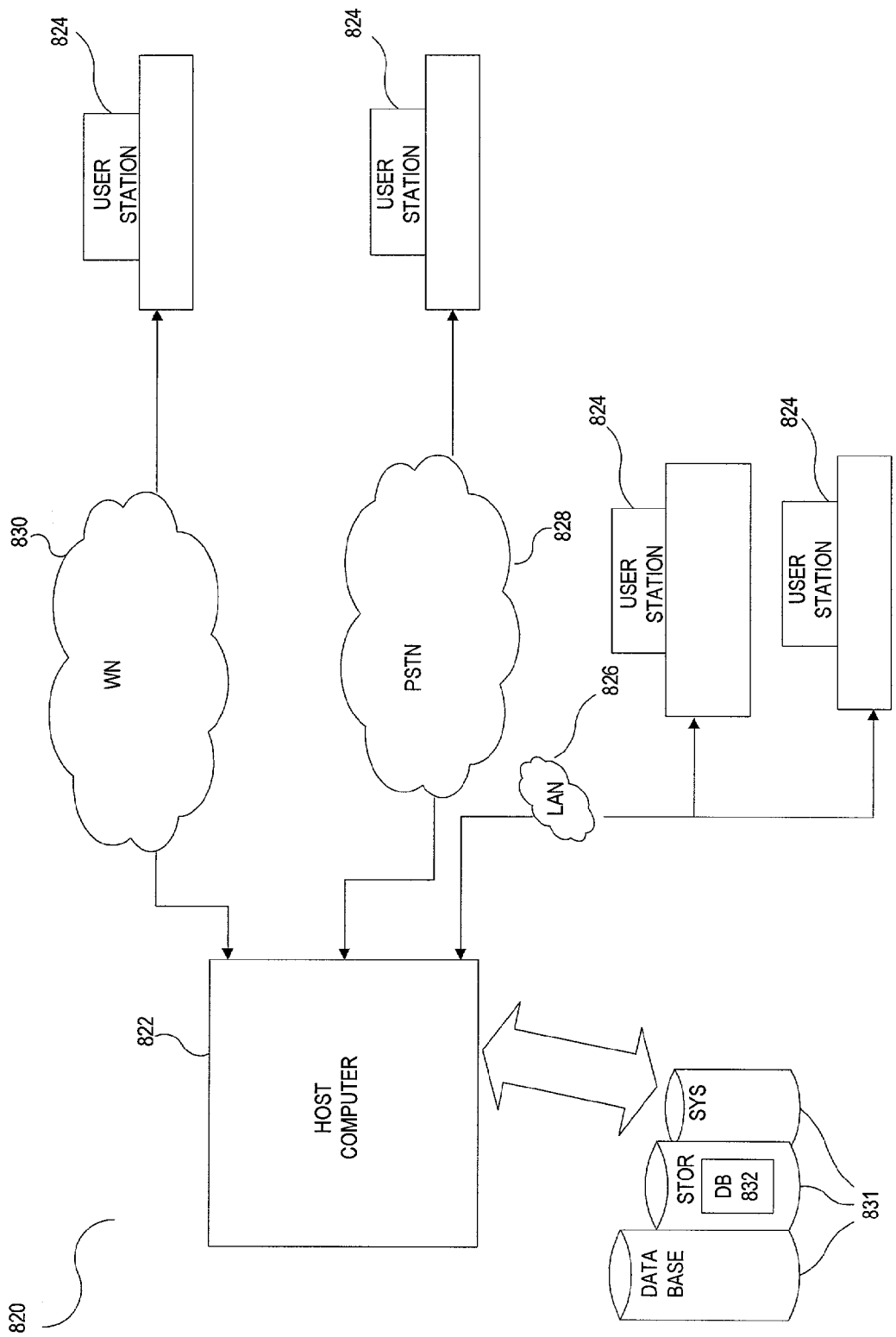
FIGS. 8 and 9 are system architectures that may be employed in an embodiment of the invention.

Referring to FIG. 8, in an embodiment, a computer system 820 that can be used to implement the invention includes a host computer 822 connected to a plurality of individual user stations 824. In an embodiment, the user stations 824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 824 are connected to the host computer 822 via a local area network ("LAN") 826. Other user stations 824 are remotely connected to the host computer 822 via a public telephone switched network ("PSTN") 828 and/or a wireless network 830.

In an embodiment, the host computer 822 operates in conjunction with a data storage system 831, wherein the data storage system 831 contains a database 832 that is readily accessible by the host computer 822. Note that a multiple tier architecture can be employed to connect user stations 824 to a database 832, utilizing for example, a middle application tier (not shown). In alternative embodiments, the database 832 may be resident on the host computer, stored, e.g., in the host computer's ROM, PROM, EPROM, or any other memory chip, and/or its hard disk. In yet alternative embodiments, the database 832 may be read by the host computer 822 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 822 can access two or more databases 832, stored in a variety of mediums, as previously discussed.

Figure 9:
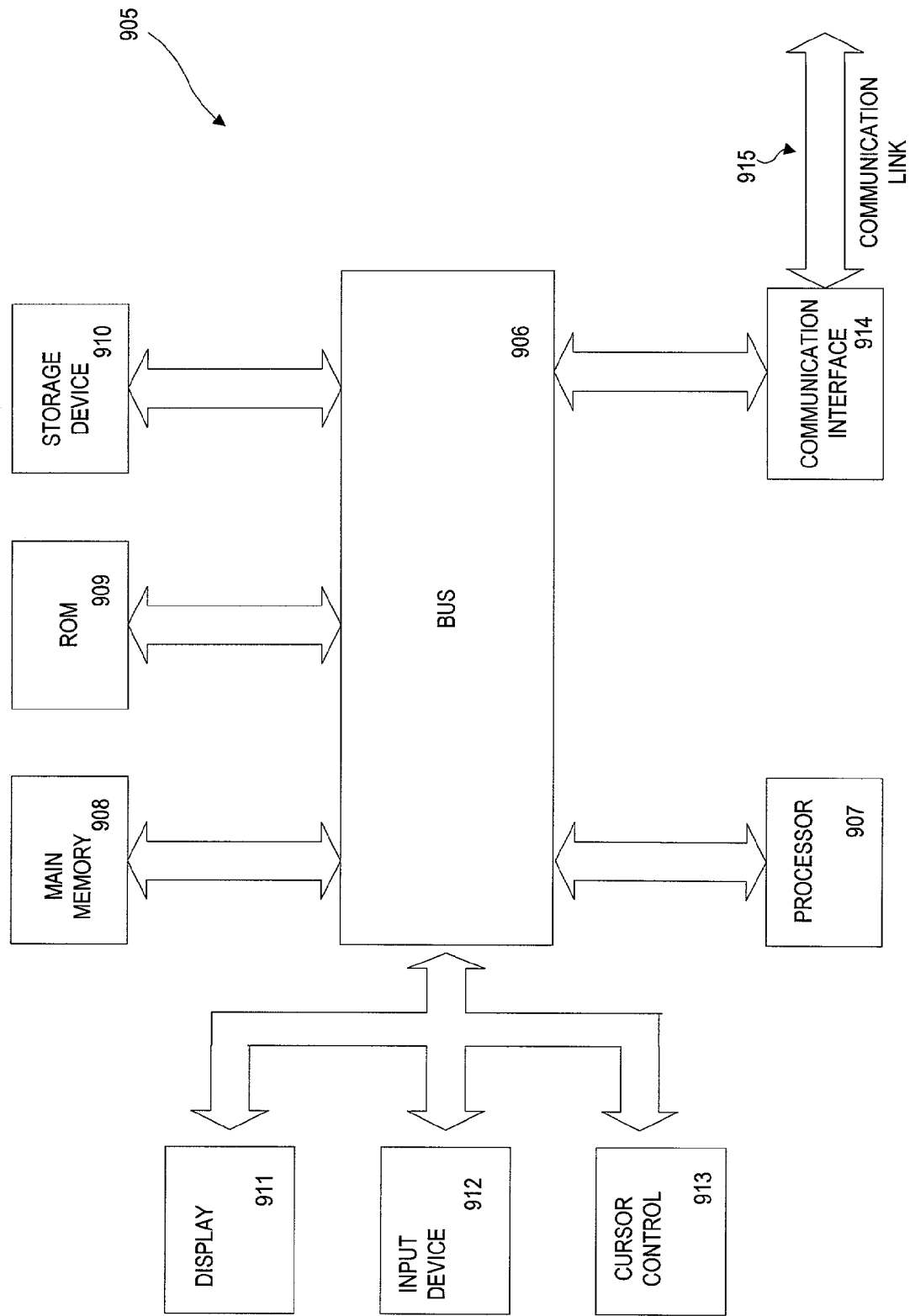

Referring to FIG. 9, in an embodiment, each user station 824 and the host computer 822, each referred to generally as a processing unit, embodies a general architecture 905. A processing unit includes a bus 906 or other communication mechanism for communicating instructions, messages and data, collectively, information, and one or more processors 907 coupled with the bus 906 for processing information. A processing unit also includes a main memory 908, such as a random access memory (RAM) or other dynamic storage device, coupled to the bus 906 for storing dynamic data and instructions to be executed by the processor(s) 907. The main memory 908 also may be used for storing temporary data, i.e., variables, or other intermediate information during execution of instructions by the processor(s) 907. A processing unit may further include a read only memory (ROM) 909 or other static storage device coupled to the bus 906 for storing static data and instructions for the processor(s) 907. A storage device 910, such as a magnetic disk or optical disk, may also be provided and coupled to the bus 906 for storing data and instructions for the processor(s) 907.

A processing unit may be coupled via the bus 906 to a display device 911, such as, but not limited to, a cathode ray tube (CRT), for displaying information to a user. An input device 912, including alphanumeric and other columns, is coupled to the bus 906 for communicating information and command selections to the processor(s) 907. Another type of user input device may include a cursor control 913, such as, but not limited to, a mouse, a trackball, a fingerpad, or cursor direction columns, for communicating direction information and command selections to the processor(s) 907 and for controlling cursor movement on the display 911.

According to one embodiment of the invention, the individual processing units perform specific operations by their respective processor(s) 907 executing one or more sequences of one or more instructions contained in the main memory 908. Such instructions may be read into the main memory 908 from another computer-usable medium, such as the ROM 909 or the storage device 910. Execution of the sequences of instructions contained in the main memory 908 causes the processor(s) 907 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 907. Such a medium may take many forms, including, but not limited to, non-volatile, volatile and transmission media. Non-volatile media, i.e., media that can retain information in the absence of power, includes the ROM 909. Volatile media, i.e., media that can not retain information in the absence of power, includes the main memory 908. Transmission media includes coaxial cables, copper wire and fiber optics, including the wires that comprise the bus 906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 907 can retrieve information. Various forms of computer-usable media may be involved in providing one or more sequences of one or more instructions to the processor(s) 907 for execution. The instructions received by the main memory 908 may optionally be stored on the storage device 910, either before or after their execution by the processor(s) 907.

Each processing unit may also include a communication interface 914 coupled to the bus 906. The communication interface 914 provides two-way communication between the respective user stations 924 and the host computer 922. The communication interface 914 of a respective processing unit transmits and receives electrical, electromagnetic or optical signals that include data streams representing various types of information, including instructions, messages and data. A communication link 915 links a respective user station 924 and a host computer 922. The communication link 915 may be a LAN 826, in which case the communication interface 914 may be a LAN card. Alternatively, the communication link 915 may be a PSTN 828, in which case the communication interface 914 may be an integrated services digital network (ISDN) card or a modem. Also, as a further alternative, the communication link 915 may be a wireless network 830. A processing unit may transmit and receive messages, data, and instructions, including program, i.e., application, code, through its respective communication link 915 and communication interface 914. Received program code may be executed by the respective processor(s) 907 as it is received, and/or stored in the storage device 910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for managing user schemas in a distributed computing system, the method comprising:
creating a first global user identification for a first user;
creating a second global user identification for a second user;
creating a local user schema at a network node, the local user schema accessible by the first and the second users;
mapping the first global user identification to the local user schema;
mapping the second global user identification to the local user schema, wherein the steps of mapping are performed without using a user name;
when the first user logs into the network node, assigning the local user schema to the first user with a first user role;
when the second user logs into the network node, assigning the local user schema to the second user with a second user role; and
wherein the first user and the second user have different privileges on the network node, a scope of the privilege for the first user is based at least partially on the first user role, and a scope of the privilege for the second user is based at least partially on the second user role.

2. The method of claim 1 in which the first and second global user identifications are stored in a directory.

3. The method of claim 2 in which the directory comprises a LDAP directory.

4. The method of claim 1 in which the network node is a database server.

5. The method of claim 1 in which a data object maps the first global user identification to the local user schema.

6. The method of claim 5 in which the data object specifically maps only the first global user identification to the local user schema.

7. The method of claim 6 in which the data object maps based upon the full distinguished name for the first user.

8. The method of claim 5 in which the data object potentially maps multiple users to the local user schema.

9. The method of claim 8 in which the data object maps based upon a partial identification of the users.

10. The method of claim 5 in which the data object maps based upon a specific computer node.

11. The method of claim 10 in which the data object resides in a directory beneath an associated server object.

12. The method of claim 5 in which the data object maps based upon a domain.

13. The method of claim 12 in which the data object resides beneath a domain object.

14. The method of claim 1 in which the first user role and the second user role are different.

15. The method of claim 1 in which privileges associated with the local schema are assigned to the first and second users.

16. The method of claim 1 in which an entry-level mapping object maps a specific user and in which a subtree-level mapping object potentially maps multiple users based upon a partial match of user identifications, wherein the entry-level mapping object takes precedence over the subtree-level mapping object.

17. The method of claim 1 in which a server mapping object and a domain mapping object both map a user, wherein the server mapping object takes precedence over the domain mapping object.

18. The method of claim 1 in which a record is maintained to track mappings to the local user schema that provides an audit trail corresponding to the first and second users.

19. The method of claim 18 in which the record distinguished between mappings for the first and second users.

20. The method of claim 1 further comprising the act of creating a local mapping at the network node, in which the first user is mapped to the local schema only if the local mapping does not contain a mapping for the first user.

21. The method of claim 1 further comprising the act of creating a non-shared schema at the network node, the local user schema being a shared schema at the network node, in which the first user is mapped to the shared schema only if the first user is not mapped to the non-shared schema.

22. The method of claim 1, wherein the scope of privilege for the first user and the scope of privilege for the second user are based also on the local user schema.

23. The method of claim 1, wherein the steps of mapping are performed using a partial distinguished name.

24. The method of claim 1, wherein the user name comprises a common name that is a component of a distinguished name.

25. A computer program product that includes a medium usable by a processor, the medium having stored thereon a sequence of instructions which, when executed by said processor, causes said processor to execute a process for user schemas in a distributed computing system, the process comprising:
creating a first global user identification for a first user;
creating a second global user identification for a second user;
creating a local user schema at a network node, the local user schema comprising an account accessible by the first and the second users;
mapping the first global user identification to the local user schema;
mapping the second global user identification to the local user schema, wherein the steps of mapping are performed without using a user name;
when the first user logs into the network node, assigning the local user schema to the first user with a first user role;
when the second user logs into the network node, assigning the local user schema to the second user with a second user role; and
wherein the first user and the second user have different privileges on the network node, a scope of the privilege for the first user is based at least partially on the first user role, and a scope of the privilege for the second user is based at least partially on the second user role.

26. The computer program product of claim 25 in which the first and second global user identifications are stored in a directory.

27. The computer program product of claim 26 in which the directory comprises a LDAP directory.

28. The computer program product of claim 25 in which the network node is a database server.

29. The computer program product of claim 25 in which a data object maps the first global user identification to the local user schema.

30. The computer program product of claim 29 in which the data object specifically maps only the first global user identification to the local user schema.

31. The computer program product of claim 30 in which the data object maps based upon the full distinguished name for the first user.

32. The computer program product of claim 29 in which the data object potentially maps multiple users to the local user schema.

33. The computer program product of claim 32 in which the partial identification comprises a partial distinguished name mapping.

34. The computer program product of claim 29 in which the data object maps based upon a specific computer node.

35. The computer program product of claim 34 in which the data object resides in a directory beneath an associated server object.

36. The computer program product of claim 29 in which the data object maps based upon a domain.

37. The computer program product of claim 36 in which the data object resides beneath a domain object.

38. The computer program product of claim 25 in which the first user role and the second user role are different.

39. The computer program product of claim 25 in which privileges associated with the local schema are assigned to the first and second users.

40. The computer program product of claim 25 in which an entry-level mapping object maps a specific user and in which a subtree-level mapping object potentially maps multiple users based upon a partial match of user identifications, wherein the entry-level mapping object takes precedence over the subtree-level mapping object.

41. The computer program product of claim 25 in which a server mapping object and a domain mapping object both map a user, wherein the server mapping object takes precedence over the domain mapping object.

42. The computer program product of claim 25 in which a record is maintained to track mappings to the local user schema that provides an audit trail corresponding to the first and second users.

43. The computer program product of claim 42 in which the record distinguished between mappings for the first and second users.

44. The computer program product of claim 25 further comprising the act of creating a local mapping at the network node, in which the first user is mapped to the local schema only if the local mapping does not contain a mapping for the first user.

45. The computer program product of claim 25 further comprising the act of creating a non-shared schema at the network node, the local user schema being a shared schema at the network node, in which the first user is mapped to the shared schema only if the first user is not mapped to the non-shared schema.

46. The computer program product of claim 25, wherein the scope of privilege for the first user and the scope of privilege for the second user are based also on the local user schema.

47. The computer program product of claim 25, wherein the steps of mapping are performed using a partial distinguished name.

48. The computer program product of claim 25, wherein the user name comprises a common name that is a component of a distinguished name.

49. A system for managing user schemas in a distributed computing system, the method comprising:
- means for creating a first global user identification for a first user;
- means for creating a second global user identification for a second user;
- means for creating a local user schema at a network node, the local user schema comprising an account accessible by the first and the second users;
- means for mapping the first global user identification to the local user schema;
- means for mapping the second global user identification to the local user schema, wherein the steps of mapping are performed without using a user name;
- means for assigning the local user schema to the first user with a first user role when the first user logs into the network node;
- means for assigning the local user schema to the second user with a second user role when the second user logs into the network node; and
- wherein the first user and the second user have different privileges on the network node, a scope of the privilege for the first user is based at least partially on the first user role, and a scope of the privilege for the second user is based at least partially on the second user role.

50. The system of claim 49, further comprising a directory for storing the first and the second global user identifications.

51. The system of claim 49, wherein the network node is a database server.

52. The system of claim 49, wherein the first user role and the second user role are different.

53. The system of claim 49, further comprising means for creating a local mapping at the network node.

54. The system of claim 49, further comprising means for creating a non-shared schema at the network node.

55. The system of claim 49, wherein the scope of privilege for the first user and the scope of privilege for the second user are based also on the local user schema.

56. The system of claim 49, wherein the steps of mapping are performed using a partial distinguished name.

57. The system of claim 49, the user name comprises a common name that is a component of a distinguished name.

* * * * *